(12) United States Patent
Kim (10) Patent No.: US 9,154,509 B2
(45) Date of Patent: Oct. 6, 2015

(54) INTELLIGENT ELECTRIC DEVICE AND NETWORK SYSTEM INCLUDING THE DEVICE

(75) Inventor: Kyung Ho Kim, Cheongju (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 13/291,525

(22) Filed: Nov. 8, 2011

(65) Prior Publication Data

US 2012/0137356 A1 May 31, 2012

(30) Foreign Application Priority Data

Nov. 30, 2010 (KR) .................. 10-2010-0120441

(51) Int. Cl.
*G06F 9/00* (2006.01)
*H04L 29/06* (2006.01)
(52) U.S. Cl.
CPC .................................. *H04L 63/105* (2013.01)
(58) Field of Classification Search
CPC ............... G06F 12/1491; G06F 2221/2141; H04L 43/00; H04W 52/0254; G08B 25/14
See application file for complete search history.

(56) References Cited

U.S. PATENT DOCUMENTS

| | | | |
|---|---|---|---|
| 7,313,825 B2* | 12/2007 | Redlich et al. ................ 726/27 |
| 7,325,248 B2* | 1/2008 | Syvanne ........................ 726/11 |
| 7,433,971 B2* | 10/2008 | Feuerstraeter et al. ....... 709/251 |
| 7,825,796 B1* | 11/2010 | Simon ...................... 340/539.17 |
| 2002/0073337 A1* | 6/2002 | Ioele et al. ................... 713/201 |
| 2004/0010572 A1* | 1/2004 | Watanabe .................... 709/220 |
| 2004/0128531 A1* | 7/2004 | Rotholtz ....................... 713/200 |
| 2004/0187022 A1* | 9/2004 | Asada et al. .................. 713/200 |
| 2005/0131583 A1* | 6/2005 | Ransom ....................... 700/295 |
| 2005/0138432 A1* | 6/2005 | Ransom et al. .............. 713/201 |
| 2005/0144437 A1* | 6/2005 | Ransom et al. .............. 713/151 |
| 2006/0195896 A1* | 8/2006 | Fulp et al. ...................... 726/11 |
| 2006/0200634 A1* | 9/2006 | Yoshida et al. ............... 711/148 |
| 2008/0162930 A1* | 7/2008 | Finney et al. ................ 713/165 |
| 2009/0002743 A1* | 1/2009 | Park et al. ................... 358/1.14 |
| 2009/0055912 A1* | 2/2009 | Choi et al. ...................... 726/6 |

(Continued)

FOREIGN PATENT DOCUMENTS

| | | |
|---|---|---|
| CN | 101232203 | 7/2008 |
| CN | 101257493 | 9/2008 |

(Continued)

OTHER PUBLICATIONS

Nian Liu et al., "Study on PMI based Access Control of Substation Automation System", IEEE Power Engineering Society General Meeting, Jun. 2006.

(Continued)

*Primary Examiner* — Shewaye Gelagay
*Assistant Examiner* — Khoi Le
(74) *Attorney, Agent, or Firm* — Lee, Hong, Degerman, Kang & Waimey (57) ABSTRACT

A protection relay installed at a power system and a network system including the protection relay are disclosed, the protection relay storing a security level of a plurality of systems or a plurality of source addresses, instructing whether to short-circuit a power by checking a security level of a data-transmitting system based on a security level stored in a security level setting device, or instructing whether to short-circuit a power by comparing the source addresses included in the data with the plurality of source addresses.

4 Claims, 4 Drawing Sheets

(56) References Cited

U.S. PATENT DOCUMENTS

| | | | |
|---|---|---|---|
| 2009/0089861 A1* | 4/2009 | Catalano et al. | 726/3 |
| 2009/0288147 A1* | 11/2009 | Yeung et al. | 726/4 |
| 2010/0073831 A1* | 3/2010 | Schweitzer, III | 361/42 |
| 2010/0191863 A1* | 7/2010 | Wing | 709/245 |
| 2011/0162050 A1* | 6/2011 | Krajna et al. | 726/4 |
| 2011/0258693 A1* | 10/2011 | Sabat et al. | 726/11 |
| 2012/0030750 A1* | 2/2012 | Bhargava et al. | 726/13 |

FOREIGN PATENT DOCUMENTS

| | | |
|---|---|---|
| CN | 101335757 | 12/2008 |
| CN | 101374047 | 2/2009 |
| EP | 1940075 | 7/2008 |
| JP | 2005-191973 | 7/2005 |
| JP | 2007-037307 | 2/2007 |

OTHER PUBLICATIONS

Japan Patent Office Application Serial No. 2011-260618, Office Action dated May 14, 2013, 3 pages.

The State Intellectual Property Office of the People's Republic of China Application Serial No. 201110399599.7, Office Action dated Jan. 30, 2014, 15 pages.

* cited by examiner

| (40) | Gateway IP : | xxx.xxx.xxx.xxx | (47) |
| (41) | Host#1 IP : | xxx.xxx.xxx.aaa | (48) |
| (42) | Host#1 Subnet : | xxx.kkk.ddd.aaa | (49) |
| (43) | Host#1 Mac : | cc.cc.cc.cc.cc.cc | (50) |
| (44) | Host#2 IP : | xxx.xxx.zzz.aaa | (51) |
| (45) | Host#2 Subnet : | yyy.aaa.bbb.ccc | (52) |
| (46) | Host#2 Mac : | cc.cc.cc.cc.dd.dd | (53) |

FIG. 5

INTELLIGENT ELECTRIC DEVICE AND NETWORK SYSTEM INCLUDING THE DEVICE

CROSS-REFERENCE TO RELATED APPLICATION

Pursuant to 35 U.S.C. §119(a), this application claims the benefit of earlier filing date and right of priority to Korean Patent Application Number 10-2010-0120441, filed Nov. 30, 2010, the contents of which are hereby incorporated by reference herein in their entirety.

BACKGROUND OF THE DISCLOSURE

1. Field of the Disclosure

The present disclosure relates to a protection relay, and more particularly to a protection relay installed at a power system and a network system including the protection relay.

2. Discussion of the Related Art

Recently, a power system uses an Ethernet to increase a communication speed, where power devices in the power system are connected to Internet to implement a web monitoring. Under this circumstance, a network must be opened to an authorized user permitted in advance to use the system, whereby illegal approach to the power devices in the power system can be blocked.

Figure 1:
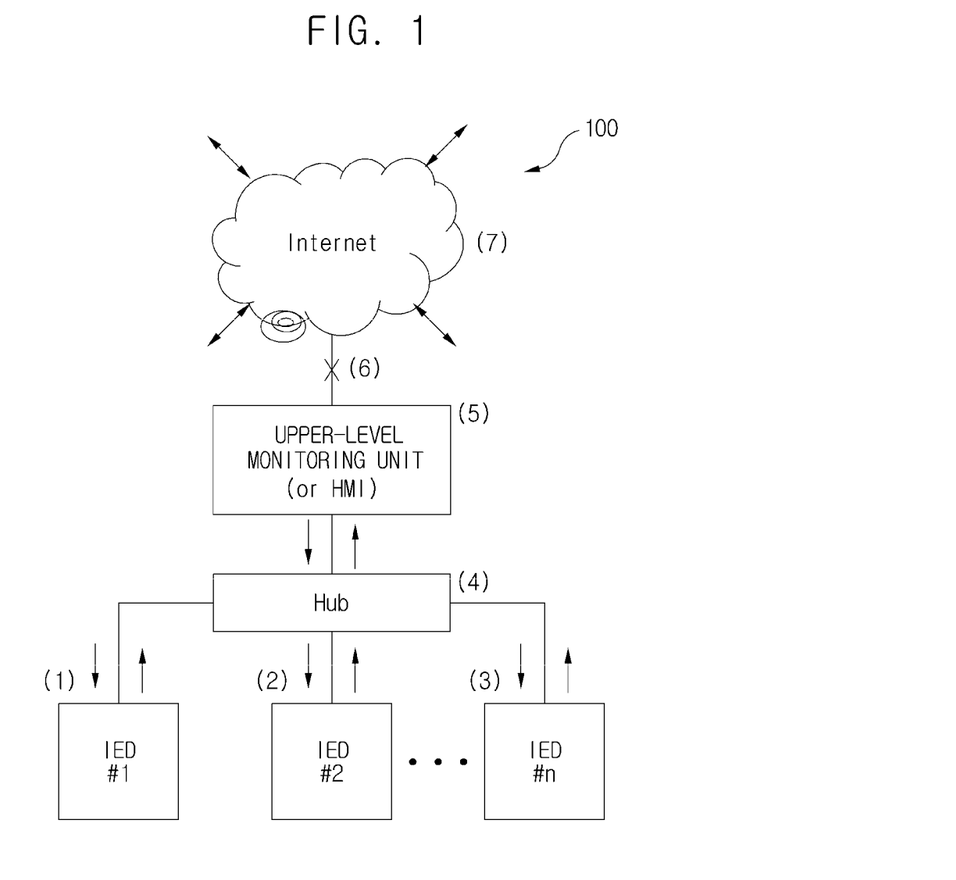
FIG. 1 illustrates an example of a general network according to prior art

FIG. 1 illustrates an example of a general network according to prior art.

Referring to FIG. 1, a network (100) includes a plurality of IEDs (Intelligent Electronic Devices) (1~3), an Ethernet communication device (4) and an upper-level monitoring unit (5). In a case the network illustrated in FIG. 1 is a network used by a substation, the plurality of IEDs (1~3) may mean one of various protection relays, a PLC (Programmable Logic Controller), a measuring instrument and a monitoring device.

The Ethernet communication device (4) is a device connecting the plurality of IEDs in the Ethernet network, and may include an Ethernet hub. The upper-level monitoring device (5) may include a SCADA (Supervisory Control And Data Acquisition) and an HMI (Human Machine Interface), and uses an independent communication network (6) that sits between an Internet (7) and the Ethernet hub (4).

The prior art substation network illustrated in FIG. 1, which is a regionally-divided network, may be excellent in terms of security but may be disadvantageous in that no connection is possible between substations, an interconnection with an upper-level system is impossible and application to a system that must be with an outside network (e.g., telecommunicating) cannot be implemented.

The Ethernet communication device (4) in FIG. 1 is a relay device located in the center of an LAN (Local Area Network) transmission line such as an intercommunication network for connection between terminal devices. Thus, although a high-priced device may be added with some security functions using a certain set-up, the frequently used Ethernet communication device (4) is devoid of such advantage.

Figure 2:
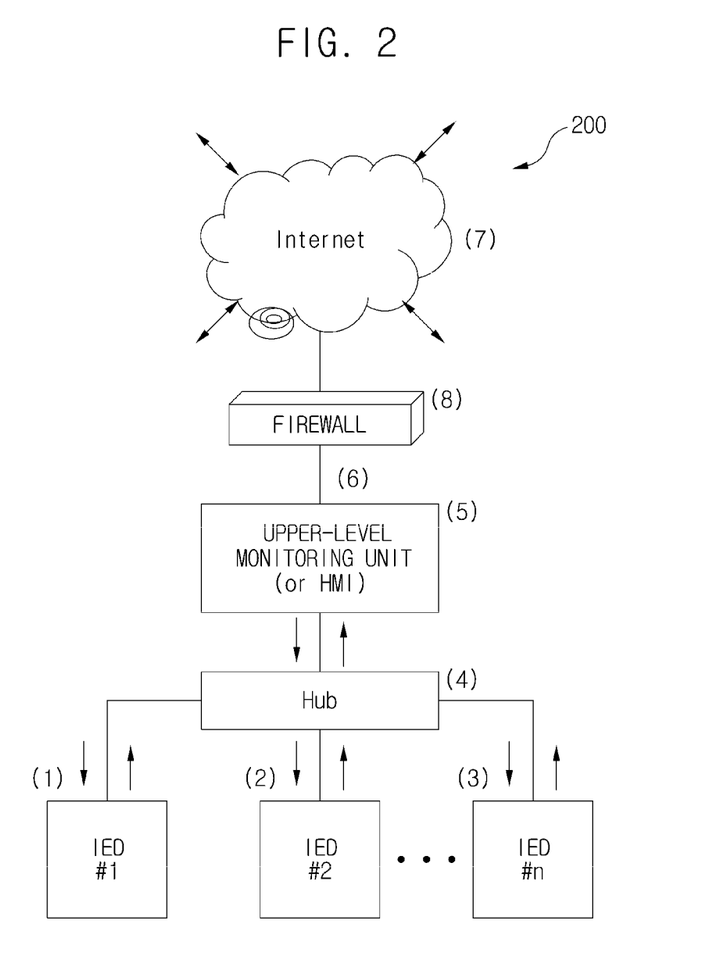
FIG. 2 illustrates another example of a general network according to prior art.

FIG. 2 illustrates another example of a general network according to prior art.

A network (200) illustrated in FIG. 2 is mounted with a high-priced firewall (8) between an outside Internet (7) and an upper-level monitoring device (5) to eliminate the disadvantage of the network illustrated in FIG. 1, and prevents an outside intrusion when the network is opened. The firewall (8) is made to be accessed by an authorized user only, where a user ID-based or a user password-based authentication system is generally employed, and in case of using a static IP (Internet Protocol), an authorized IP is employed to get access.

Under this configuration, however, the firewall (8) is the only means to block the outside intrusion in case of the system in FIG. 2, such that it is impossible to protect an inner system against hacking caused by repair of the firewall, and/or hacking from intentional or unintentional inner hacking.

BRIEF SUMMARY

The present disclosure is directed to cope with the above-mentioned problems/disadvantages and to provide a protection relay configured to prevent an erroneous operation of a system by hacking through determination of a process on a received data by using a source address included in a system that has transmitted the data inputted from a communication network or a data, and a network system including the protection relay.

The protection relay according to the present disclosure doubly protects a system through decline of an instruction received from non-authorized personnel by adding a security function to the protection relay itself.

Technical problems to be solved by the present disclosure are not restricted to the above-mentioned description, and any other technical problems not mentioned so far will be clearly appreciated from the following description by the skilled in the art.

In one general aspect of the present disclosure, there is provided a protection relay determining a process of a data received through an Ethernet communication device, the protection relay comprising: a security level setting device storing a security level of a plurality of systems; and a user checking device checking the security level of the data-transmitting systems based on the security level stored in the security level setting device to generate a check/instruction signal including information instructing whether to short-circuit a power.

Preferably, the data includes information related to monitoring and/or controlling of the protection relay and an upper-level host of the protection relay.

Preferably, the security level setting device stores a security level applied from outside, or changes the stored security level based on the security level applied from outside.

Preferably, the security level is determined by use or non-use of information on the upper-level host.

Preferably, the security level includes a first security level using some pieces of information among the information on the upper-level host; and a second security level using the information on the upper-level host.

Preferably, the first security level uses an IP address and a subnet address of the upper-level host.

Preferably, the second security level uses an MAC address of the upper-level host.

In one general aspect of the present disclosure, there is provided a protection relay determining a process of a data received through an Ethernet communication device, the protection relay comprising: a security level setting device storing a security level of a plurality of source addresses; and a user checking device comparing a security level of the source addresses included in the data with that of the plurality of source addresses stored in the security level setting device to generate a comparison/instruction signal including information instructing whether to short-circuit a power.

Preferably, the data includes information related to monitoring and/or controlling of the protection relay and an upper-level host of the protection relay.

Preferably, the security level setting device stores a security level applied from outside, or changes the stored security level based on the security level applied from outside.

Preferably, the security level is determined by use or non-use of information on the upper-level host.

Preferably, the security level includes a first security level using some pieces of information among the information on the upper-level host; and a second security level using the information on the upper-level host.

Preferably, the first security level uses an IP address and a subnet address of the upper-level host.

Preferably, the second security level uses an MAC address of the upper-level host.

In another general aspect of the present disclosure, there is provided a network system comprising: an Ethernet communication device; and at least one protection relay determining a process of a data received through the Ethernet communication device, wherein the at least one protection relay storing a security level of a plurality of systems or a plurality of source addresses, instructing whether to short-circuit a power by checking the security level of the data-transmitting systems based on the security level stored in a security level setting device, or instructing whether to short-circuit a power by comparing the source addresses included in the data with the plurality of source addresses.

Preferably, the network system further comprises at least one of a PLC (Programmable Logic Controller), a measuring instrument and a monitoring device implementing a communication with an upper-level monitoring device via the Ethernet communication device.

Preferably, the data includes information related to monitoring and/or controlling of the protection relay and an upper-level host of the protection relay.

A protection relay and a network system including the protection relay according to the present disclosure have an advantageous effect of preventing an erroneous operation of a system by hacking through determination of a process on a received data by using a source address included in a system or a data that has transmitted the data inputted from a communication network, and a network system including the protection relay.

Various aspects and embodiments of the disclosure are described in further detail below.

The Brief Summary is neither intended nor should it be construed as being representative of the full extent and scope of the present disclosure, which these and additional aspects will become more readily apparent from the detailed description, particularly when taken together with the appended drawings. As mentioned above, the Summary is not an extensive overview and is not intended to identify key or critical elements of the apparatuses, methods, systems, processes, and the like, or to delineate the scope of such elements. This Summary provides a conceptual introduction in a simplified form as a prelude to the more-detailed description that follows

BRIEF DESCRIPTION OF THE DRAWINGS

The accompanying drawings, which are included to provide a further understanding of the present disclosure and are incorporated in the present disclosure and constitute a part of this application, and together with the description, serve to explain the principle of the disclosure. In the drawings.

DETAILED DESCRIPTION

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thereafter," "then," "next," etc. are not intended to limit the order of the processes; these words are simply used to guide the reader through the description of the methods.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

The following includes definitions of selected terms employed herein. The definitions include various examples, forms, or both of components that fall within the scope of a term and that may be used for implementation. The examples are not intended to be limiting. Both singular and plural forms of terms may be within the definitions.

As employed herein, the term "a protection relay or a protective relay" is an apparatus for protecting a network from various accidents of a line such as an over-current, a short circuit, and a ground fault, and since it periodically reports a line state of the actual spot and measurement data to an upper-level monitoring unit, reliability in communication with the upper-level monitoring unit is required. Lower-level apparatuses, such as protection relay and switch, transceive important data for network and measurement via Ethernet. The protection relay is called an IED (Intelligent Electronic Device). The protection relay is employed in a substation to prevent occurrence of problems in transmission and reception of power.

As employed herein, the term "Ethernet" is a family of computer networking technologies for local area networks (LANs) commercially introduced in 1980. Standardized in IEEE 802.3, Ethernet has largely replaced competing wired LAN technologies. Systems communicating over Ethernet divide a stream of data into individual packets called frames. Each frame contains source and destination addresses and error-checking data so that damaged data can be detected and re-transmitted. The standards define several wiring and signaling variants. The original 10BASE5 Ethernet used coaxial cable as a shared medium. Later the coaxial cables were replaced by twisted pair and fiber optic links in conjunction with hubs or switches. Data rates were periodically increased from the original 10 megabits per second, to 100 gigabits per second. Since its commercial release, Ethernet has retained a good degree of compatibility. Features such as the 48-bit MAC address and Ethernet frame format have influenced other networking protocols.

As employed herein, the term "Ethernet hub" is a device for connecting multiple twisted pair or fiber optic Ethernet devices together and making them act as a single network segment. Hubs work at the physical layer of the OSI model. The device is a form of multiport repeater. Repeater hubs also participate in collision detection, forwarding a jam signal to all ports if it detects a collision. Computers and network devices connected to a same hub can perform mutual communication together.

HMI (Human Machine Interface) to be used as an example of an upper-level monitoring device is also called MMI (Man Machine Interface). The HMI reads a memory value of an outside device connected to a computer, links the memory value read from a screen to a graphically-processed object, and performs a function of displaying changes in colors and numerical values.

As employed herein, the term "PLC (Programmable Logic Controller)" is a digital computer that has embodied in an integrated circuit functions of a relay, a timer and a counter mounted on a control panel. The PLC is a general-purpose computer that has added a computing function to a basic sequence control function for program control.

Now, the present disclosure according to exemplary embodiments of the present invention will be described in detail with reference to the accompanying drawings, where the same reference numerals will be assigned to the same elements in the explanations of the figures throughout the descriptions, and explanations that duplicate one another will be omitted.

Figure 3:
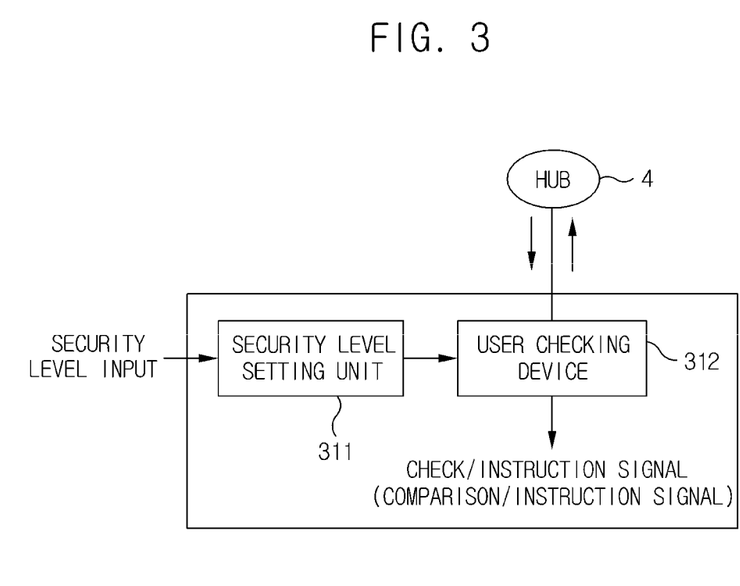
FIG. 3 is an inner block diagram of a protection relay according to an exemplary embodiment of the present disclosure.

FIG. 3 is an inner block diagram of a protection relay according to an exemplary embodiment of the present disclosure.

Referring to FIG. 3, a protection relay (300) includes a security level setting device (311) and a user check device (312).

The security level setting device (311) stores a security level of a plurality of systems or a plurality of source addresses inputted from outside, or changes the stored security level using the security level of the plurality of systems or the plurality of source addresses inputted from the outside.

The security level may be set up for change, even during operation of the protection relay (300), and particularly, in a case the security level is set up high, it can be configured to be set up only at a site where the protection relay (300) is operated. Furthermore, the setting up or changing of security level at the site, being applicable to the existing physical security level, can greatly enhance security of the network. The security algorithm is advantageously unlimited to the currently operated software and applicable to various currently employed RTOSs (Real Time Operation Systems).

The user checking device (312) tranceives data with an Ethernet communication device (4), and checks a security level of a data-transmitting system based on the security level received from the security level setting device (311) prior to process of the received data, to subsequently generate a check/instruction signal including information instructing whether to short-circuit a power, or to generate a comparison/instruction signal whether to short-circuit a power by comparing a security level corresponding to a source address included in the data received by processing the received data and a security level corresponding to a source address received from the security level setting device (311), where the data received from the Ethernet hub (4) is limited to a data related to monitoring or controlling the protection relay or an upper-level host of the protection relay.

In the present disclosure, in order to check whether data has been inputted from a hacker, a check/instruction signal or a comparison/instruction signal for determining whether to implement monitoring or controlling function included in the data is generated by using a security state of a system that has transmitted the data prior to data-processing, and using a security state of source address included in the data in a case the data includes the source address and destination address.

The check/instruction signal and the comparison/instruction signal instruct whether to allow the protection relay to interrupt a power or to maintain the power, whereby security to each protection relay can be maintained to disable the monitoring and controlling functions in a case the data is one that is inputted from non-authorized personnel.

The present disclosure is advantageously configured in such a manner that compatibility or suitability of data that has passed a firewall capable of protecting a system can be checked through authentication process of the system that has transmitted the data, prior to data processing, and the data goes through an authentication process of the source address included in the data to doubly check the compatibility or suitability of data, even during the data-processing.

The security levels set up by the protection relay may be classified based on use or non-use of information on upper-level hosts of the protection relay.

Figure 4:
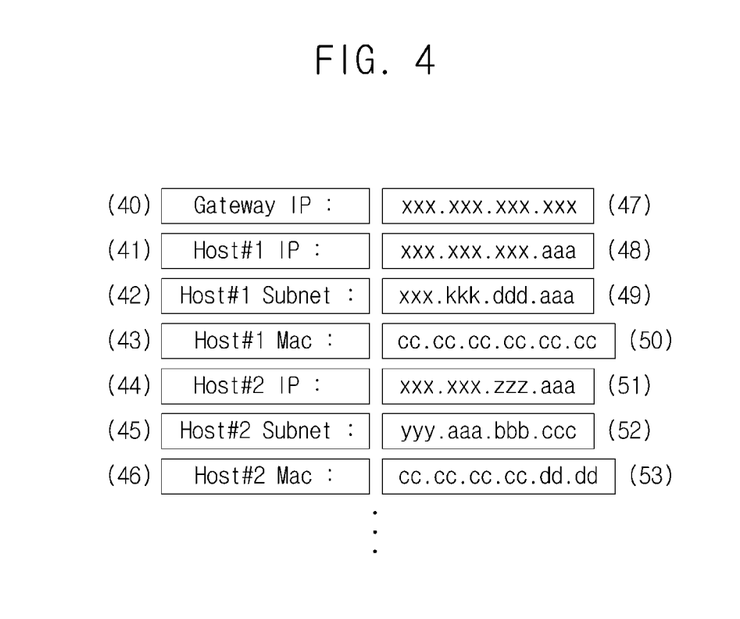
FIG. 4 illustrates a protection relay and addresses of hosts according to an exemplary embodiment of the present disclosure.

FIG. 4 illustrates a protection relay and addresses of hosts according to an exemplary embodiment of the present disclosure.

We can check from FIG. 4 an IP address (47) of a protection relay (40), a first host IP address (48), a first host subnet address (49), a first host MAC address (50), a second host IP address (51), a second host subnet address (52) and a second host MAC address (53).

In setting up a protection level for the protection relay, additional set-up information is needed besides a self IP (40), such that information on IPs (41~46) of upper-level hosts illustrated in FIG. 4 must be added.

A first security level having a low security level is suitable for application where an outside network and the present network are separated, such that information on upper-level hosts is not employed at all.

A second security level having an ordinary security level uses addresses of hosts (41, 44) and subnet (42, 45) among information on upper-level hosts. A protection relay (300) recognizes on the IPs of hosts where security levels are set up among requests transmitted from a plurality of hosts and implements the processing.

Through this processing implementation, a request transmitted from a user who is not authorized host in substation operation is cancelled, and leaves log-in information as an event. In this case, if the user is not authorized personnel, the user can access to a relevant protection relay through log-in and receipt of authentication. Although security filtering using only IP has a disadvantage of being susceptible to hacking such as an IP hooking, there is an advantage that an overall processing speed is fast due to a fewer filtering conditions.

A third securing level having a higher security level uses all the information on upper-level hosts. The IP hooking is very easy in the modern hacking methods, and therefore, all network ports officially have only one single MAC address to address the disadvantage. Although it is easy to hack the IP address, the MAC address is hard to access unless there is information on overall network operation.

Thus, the third securing level having a highest security level responds only to hosts where IP address and MAC address are all matched in information on hosts capable of communicating with the protection relay, which is to interrupt an access to hosts having unauthorized MAC address, although an authorized IP address may be available by mapping the MAC address to the IP address during initial stage of hacking.

Figure 5:
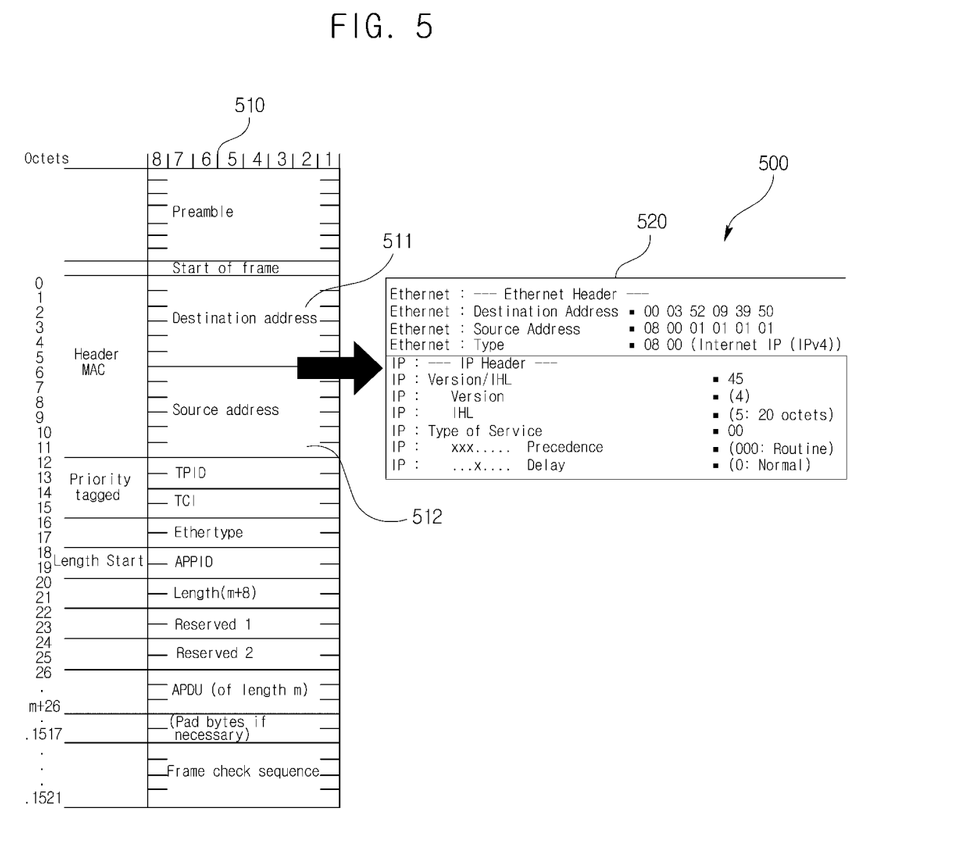
FIG. 5 illustrates a frame format of ISO/IEC 8802-3 according to an exemplary embodiment of the present disclosure.

FIG. 5 illustrates a frame format of ISO/IEC 8802-3 used in exemplary embodiment of the present disclosure.

Referring to FIG. 5, a basic frame (510) of Ethernet includes a destination address (511) and a source address (512). Reference numeral 520 shows a captured part of basic frame, where an identity of an opponent that has transmitted data from a source address belonging to the basic frame can be checked. If it is determined that the data is a data transmitted from a place other than a prior-set source address, the relevant data is not processed.

The previous intrusion by hackers used to be an unlawful intrusion by a simple change in IP or in port number, which could be blocked by an excellent firewall. Furthermore, it was difficult to hack a system or to propagate virus due to the fact that the conventional industrial devices used to employ UNIX or RTOS. Besides, the conventional network used to be configured in a limited small-sized system, such that interference elements such as physical shocks or outside factors rather than those through communication were abundant.

Devices or equipment on a power system checking only suitability of protocol used to process not only monitoring instructions but also controls affecting an overall system and trip instructions due to lack of security function capable of checking an adequate protocol instruction transmitted from an inadequate user.

The conventional security system relying on a firewall has been inevitably weak to a certain type of hacking that maintains an instruction type of normally authorized personnel when passing through a firewall using a technical development of hacking, but that changes to a 'worm' or a 'spy behavior' after passing through the firewall. Particularly, the conventional security system has been inevitably susceptible to a hacking that can immobilize a firewall by directly attacking the firewall such as the D-DOS that has created a big trouble to the domestic Internet years before.

A method totally relying on a firewall for security purpose has become unstable in a time when electric and power systems configured of a small-sized local network has evolved to a current broadband system configured of a broadband integrated network to implement a telecommuting and Internet monitoring and control.

The present disclosure therefore proposes a dual security device capable of declining an instruction received from non-authorized personnel by adding a security function to a protection relay itself. The technical field applied to the present disclosure is a system connected to an Internet for web monitoring on a digital protection relay, a network device and the like using a high speed communication of Internet as a communication medium. The security function of these systems can be enhanced free from using a device such as a firewall that costs lots of expenses.

Therefore, the present disclosure may be an efficient measure to block an access by non-authorized personnel through hacking to a power network by an unlawful hacker in a time when digitalized protection relays monitor and control a complicated power network.

The protection relay and a network system including the protection relay according to the present disclosure have an industrial applicability of preventing an erroneous operation of a system by hacking through determination of a process on a received data by using a source address included in a system or a data that has transmitted the data inputted from a communication network, and a network system including the protection relay.

It should be noted that while a network formed with the protection relay and the network system including the protection relay according to the present disclosure has been depicted in the figures and referred to throughout this specification, a person of skill in the art will realize that a security method performed in a network could be easily derived from the foregoing description and explanation, such that explanation thereto is omitted.

The foregoing description of the disclosure has been presented for purposes of illustration and description, and is not intended to be exhaustive or to limit the disclosure to the precise form disclosed. The description was selected to best explain the principles of the disclosure and practical application of these principles to enable others skilled in the art to best utilize the disclosure in various embodiments and various modifications as are suited to the particular use contemplated. It is intended that the scope of the disclosure not be limited by the specification, but be defined by the claims set forth below.

What is claimed is:

1. A network system comprising:
   an Ethernet communication device;
   an upper-level monitoring device positioned between an outside Internet and the Ethernet communication device;
   a firewall positioned between the outside Internet and the upper-level monitoring device and being configured to permit checking compatibility or suitability of data through an authentication process of the system; and
   at least one protection relay configured to:
      determine a process of data received through the Ethernet communication device;
      store a first security level of a plurality of systems and a second security level of a plurality of source addresses;
      check a security level of a system among the plurality of systems that transmits the data based on the first security level and check a security level of a source address among the plurality of source addresses that is included in the data based on the second security level prior to and during processing the data to permit re-checking compatibility or suitability of data that have passed the firewall through an authentication process of the source address;
      generate a signal including information instructing whether to short-circuit power based on results of the checking,
      wherein the received data includes at least information related to monitoring or controlling the at least one protection relay or information related to monitoring or controlling an upper-level host of the at least one protection relay,
      wherein the security level of the system is determined based on use or non-use of the information related to monitoring or controlling the upper-level host, and
      wherein the first security level uses an IP address and a subnet address of the upper-level host, and the second security level uses an MAC address of the upper-level host.

2. The network system of claim 1, further comprising at least a PLC (Programmable Logic Controller) or a measuring instrument.

3. The network system of claim 1, wherein the at least one protection relay is installed at an electric power system providing electric power.

4. The network system of claim 1, wherein the at least one protection relay stores a security level applied from outside, or changes the stored security level based on the security level applied from outside.

* * * * *